United States Patent
Fu

(10) Patent No.: US 10,286,909 B2
(45) Date of Patent: May 14, 2019

(54) METHOD AND APPARATUS FOR THE CLOSED-LOOP AND/OR OPEN-LOOP CONTROL OF A LATERAL GUIDANCE OF A VEHICLE WITH THE AID OF A LANE-KEEPING ASSIST, AND LANE-KEEPING ASSIST

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 71 days.

(21) Appl. No.: 15/535,497

(22) PCT Filed: Oct. 26, 2015

(86) PCT No.: PCT/EP2015/074722
§ 371 (c)(1),
(2) Date: Jun. 13, 2017

(87) PCT Pub. No.: WO2016/102101
PCT Pub. Date: Jun. 30, 2016

(65) Prior Publication Data
US 2017/0355367 A1   Dec. 14, 2017

(30) Foreign Application Priority Data

Dec. 22, 2014  (DE) .................... 10 2014 226 759

(51) Int. Cl.
*B60W 30/12* (2006.01)
*B60W 50/00* (2006.01)
(52) U.S. Cl.
CPC ..... *B60W 30/12* (2013.01); *B60W 2050/0008* (2013.01); *B60W 2050/0012* (2013.01)

(58) Field of Classification Search
CPC ........ B60W 30/12; B60W 2050/0012; B60W 2050/0008
See application file for complete search history.

(56) References Cited

U.S. PATENT DOCUMENTS 2,456,473 A * 12/1948 Turner .................... B60C 27/02
                                                                  152/226
2,634,527 A *  4/1953 Pletscher ................. B60R 7/08
                                                                  224/277
(Continued)

FOREIGN PATENT DOCUMENTS

DE   102007052258 A1   6/2008
DE   102009028647 A1   2/2011
(Continued)

OTHER PUBLICATIONS

Machine Translation DE102007052258A1 (Year: 2007).*
(Continued)

*Primary Examiner* — Frederick M Brushaber
(74) *Attorney, Agent, or Firm* — Norton Rose Fulbright US LLP; Gerard Messina

(57) ABSTRACT

A method for the closed-loop and/or open-loop control of a lateral guidance of a vehicle with the aid of a lane-keeping assist. In the process, a detection signal is read in which represents hands-off and/or hands-on driving of the vehicle. If the detection signal represents the hands-off driving, then a closed-loop control signal is provided for controlling the lateral guidance in closed loop. On the other hand, if the detection signal represents the hands-on driving, then an open-loop control signal is provided for controlling the lateral guidance in open loop.

8 Claims, 2 Drawing Sheets

(56) References Cited

U.S. PATENT DOCUMENTS

| | | | | |
|---|---|---|---|---|
| 5,219,212 | A * | 6/1993 | Shimada | B60T 8/1755 188/181 A |
| 2006/0042839 | A1 * | 3/2006 | Iwaki | B60K 17/356 180/6.3 |
| 2008/0183342 | A1 | 7/2008 | Kaufmann et al. | |
| 2010/0010710 | A1 * | 1/2010 | Kopp | B60G 17/0162 701/38 |
| 2010/0023211 | A1 * | 1/2010 | Ammon | B60G 17/0165 701/37 |
| 2010/0170415 | A1 * | 7/2010 | Dietmaier | B61F 5/38 105/171 |
| 2012/0026348 | A1 * | 2/2012 | Yun | G03B 7/26 348/208.4 |
| 2012/0049617 | A1 * | 3/2012 | Furuyama | B60T 8/1766 303/9.75 |
| 2012/0191266 | A1 | 7/2012 | Kluge | |
| 2016/0304123 | A1 * | 10/2016 | Lewis | B62D 5/043 |
| 2017/0232973 | A1 * | 8/2017 | Otake | B60W 50/082 701/43 |
| 2017/0355367 | A1 * | 12/2017 | Fu | B60W 30/12 |
| 2019/0009816 | A1 * | 1/2019 | Moreillon | B62D 6/10 |

FOREIGN PATENT DOCUMENTS

| | | | |
|---|---|---|---|
| DE | 102012207549 A1 | 11/2012 | |
| DE | 102012002318 A1 | 8/2013 | |
| DE | 102013009424 A1 | 12/2014 | |
| DE | 102013010928 A1 | 12/2014 | |
| WO | WO2014029388 A1 * | 1/2014 | ........... B60K 28/066 |
| WO | 2014029388 A1 | 2/2014 | |

OTHER PUBLICATIONS

Machine Translation DE102009028647A1 (Year: 2009).*
Machine Translation DE102012207549A1 (Year: 2012).*
Machine Translation DE102013009424A1 (Year: 2013).*
International Search Report dated Jan. 25, 2016, of the corresponding International Application PCT/EP2015/074722 filed Oct. 26, 2015.

* cited by examiner

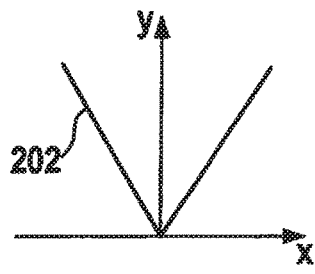 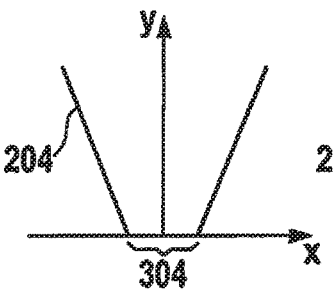 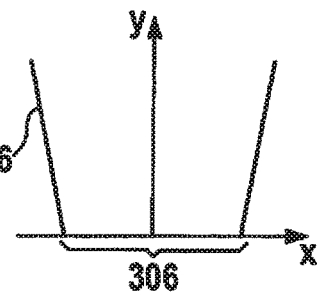
Fig. 3a  Fig. 3b  Fig. 3c
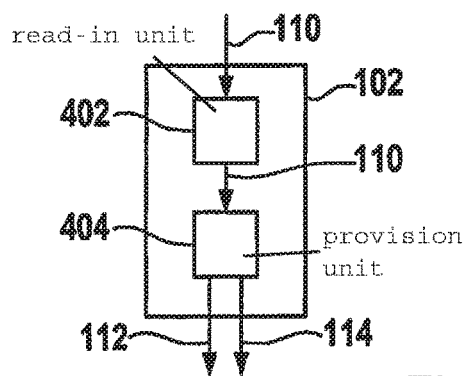
Fig. 4
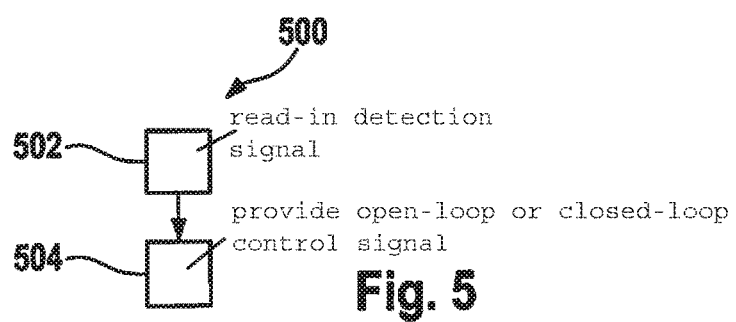
Fig. 5

METHOD AND APPARATUS FOR THE CLOSED-LOOP AND/OR OPEN-LOOP CONTROL OF A LATERAL GUIDANCE OF A VEHICLE WITH THE AID OF A LANE-KEEPING ASSIST, AND LANE-KEEPING ASSIST

FIELD

The present invention relates to a method for the closed-loop and/or open-loop control of a lateral guidance of a vehicle with the aid of a lane-keeping assist, a corresponding apparatus, a lane-keeping assist, as well as a corresponding computer program.

BACKGROUND INFORMATION

Lane-keeping assists are used to assist a driver in the lateral guidance of his vehicle. For example, a lane-keeping assist may be realized with a center-guidance function, by which the vehicle is able to be kept in the center of a traffic lane. In so doing, the vehicle may be steered predominantly by the lane-keeping assist. In addition, conventional lane-departure-prevention systems intervene as late as possible in a steering process.

SUMMARY

In accordance with an example embodiment of the present invention, a method is provided for the closed-loop and/or open-loop control of a lateral guidance of a vehicle with the aid of a lane-keeping assist, as well as an apparatus which uses this method, a lane-keeping assist, and finally, a corresponding computer program. Advantageous refinements are described herein.

An example method for the closed-loop and/or open-loop control of a lateral guidance of a vehicle with the aid of a lane-keeping assist includes the following steps:

Read-in of a detection signal that represents hands-off and/or hands-on driving of the vehicle; and Provision of a closed-loop control signal for controlling the lateral guidance in closed loop when the detection signal represents the hands-off driving, and/or an open-loop control signal for controlling the lateral guidance in open loop when the detection signal represents the hands-on driving.

A vehicle may be understood to be a motor vehicle such as an automobile or truck, for instance. In general, a lane-keeping assist may be understood to be a driver assist system, which is used to assist a driver when guiding his vehicle in a traffic lane. In particular, the lane-keeping assist may be used for lateral guidance, i.e., for influencing a lateral position of the vehicle in the traffic lane.

A closed-loop control may be understood to be a self-contained functional sequence for influencing a steering of the vehicle, for instance, based on a distance of the vehicle from a center or an edge of a traffic lane. In the process, a setpoint value of the distance may be coupled back continuously to an actual value of the distance, and any deviation between the setpoint value and actual value may be regulated toward zero by suitable interventions in the steering system.

An open-loop control may be understood to be an open functional chain in which no feedback takes place between the setpoint value and actual value. For example, depending on the distance determined to the edge or the center of the lane, the open-loop control may be used to output a warning to the driver in the form of an acoustic, visual or haptic signal.

For instance, the detection signal may be provided by a hand-detection device for detecting a hand on the steering wheel of the vehicle. The hand-detection device may be designed to sense a holding force exerted by the hand on the steering wheel, and to provide the detection signal depending on the holding force sensed. For example, in the case of no or very little holding force, the detection signal may represent the hands-off driving, and in the case of greater holding force, the hands-on driving.

A lane-keeping assist of a vehicle may be switched between an open-loop control mode and a closed-loop control mode depending on detection of a hand on the steering wheel.

Such a combination of open-loop and closed-loop control offers the advantage that steering of the vehicle may be stabilized sufficiently even when the driver is driving hands-free. For example, in this case, by switching from the open-loop control to the closed-loop control, it is possible to prevent the vehicle from swinging back and forth between two lane boundaries, and in the worst case, drifting away from the traffic lane.

Furthermore, conversely, by switching from the closed-loop control to the open-loop control, it is possible to prevent the driver from feeling domineered by the closed-loop control, for instance, by a steering torque generated by the closed-loop control and counteracting a steering movement by the driver, when the driver would like to travel a trajectory different from that provided by the closed-loop control. Because the driver no longer has the impression of having to steer needlessly against the system, even when he would like to steer as quickly as needed back in the direction of the center of the lane, the driving feel perceived by the driver is able to improve.

The method may be provided with a step of sensing a holding force exerted by at least one hand on a steering wheel of the vehicle. In an output step, the detection signal may be provided as a function of the holding force, especially in consideration of a predetermined debounce time and, additionally or alternatively, a predetermined threshold value for the holding force. For instance, a holding force may be understood to be a manual steering torque, manual torque for short, exerted by the driver with the aid of the steering wheel, or a deformation force with which the driver deforms the steering wheel upon changing his grip. A debounce time may be understood to be a predetermined time span of, e.g., less than 5 ms, during which the holding force must at least be sensed in order to generate the detection signal. A threshold value may be understood to be a value or a value range which is used as decision limit with regard to the output of the detection signal. For example, the threshold value may represent a reference manual steering torque for distinguishing between a steering wheel that is not held and a steering wheel that is held. This specific embodiment permits a reliable differentiation between hands-off driving and hands-on driving. Destabilization of the vehicle because a switchover between open-loop control and closed-loop control is too fast or too slow may also be prevented by the debounce time.

In addition, it is advantageous if, in the read-in step, a predetermined control profile activated by the driver is also read in. In the provision step, the open-loop control signal may be provided using the control profile, in order to control the lateral guidance of the vehicle in open loop according to the control profile. A control profile may be understood to be a predetermined control behavior of the open-loop control. For instance, the control profile may be stored in a memory of the lane-keeping assist, and be selected and activated by a suitable input by the driver. A simple adaptation of the open-loop control to the wishes and habits of the driver is thereby made possible.

For instance, the control profile may represent a characteristic of a steering torque for the steering assistance as a function of a lateral position of the vehicle in a traffic lane. The steering torque may be a torque which is counter to the manual steering torque exerted by the driver. For example, the steering torque may be applied to the steering wheel in order to alert the driver to a deviation of the vehicle from a setpoint trajectory, e.g., from the center of the lane. For instance, the steering torque may become greater with increasing distance of the vehicle from the center of the lane. This specific embodiment makes it possible to realize an effective and reliable open-loop control for the steering assistance.

According to a further specific embodiment, the steering torque within a predetermined distance from a center of the traffic lane, also referred to as dead zone, may be equal to zero or at least approach zero. In this manner, the driver has full control over the vehicle, provided the vehicle is located in the center of the lane or at least near the center of the lane. A lane-keeping torque configurable in such a way is able to contribute to a noticeable improvement in driving comfort.

In addition, it may be beneficial if in the read-in step, at least one further predetermined control profile activated by the driver is read in. The control profile and the further control profile may differ from each other. In the provision step, the open-loop control signal may be provided using the further control profile, in order to control the lateral guidance of the vehicle in open loop according to the further control profile. The configurability of the open-loop control may thereby be improved.

In the read-in step, an activation signal may be read in which represents an activation by the driver of a closed-loop steering-control function of the lane-keeping assist. In the provision step, the closed-loop control signal may be provided using the activation signal, regardless of the detection signal. This specific embodiment provides the driver with the possibility of completely deactivating the open-loop control of the lane-keeping assist if necessary.

The present invention also provides an apparatus which is designed to carry out, control or implement the steps of a variant of a method presented here in suitable devices. The object of the present invention may be achieved quickly and efficiently by this embodiment variant of the invention in the form of an apparatus, as well.

In the present case, an apparatus may be understood to be an electrical unit that processes sensor signals and outputs control signals and/or data signals as a function thereof. The apparatus may have an interface which may be implemented in hardware and/or software. In the case of a hardware implementation, the interfaces may be part of what is termed a system ASIC, for example, that includes a wide variety of functions of the apparatus. However, it is also possible for the interfaces to be separate, integrated circuits or to be made up at least partially of discrete components. If developed in software, the interfaces may be software modules which, for example, are present in a microcontroller in addition to other software modules.

In addition, the present invention provides a lane-keeping assist having the following features:

a closed-loop control unit for controlling a lateral guidance of a vehicle in closed loop;

an open-loop control unit for controlling the lateral guidance in open loop; and an apparatus according to a specific embodiment described here, which is coupled to the closed-loop control unit and/or the open-loop control unit.

Also of advantage is a computer-program product or computer program having program code that may be stored on a machine-readable carrier or storage medium such as a semiconductor memory, a hard-disk storage or an optical memory, and is used to carry out, implement and/or control the steps of the method according to one of the previously described specific embodiments, especially when the program product or program is executed on a computer or a device.

The present invention is explained below in greater detail by way of example with reference to the figures.

BRIEF DESCRIPTION OF THE DRAWINGS

FIG. 3a, 3b, 3c show schematic representations of control profiles according to various exemplary embodiments of the present invention.

FIG. 4 shows a block diagram of an apparatus according to one exemplary embodiment of the present invention.

FIG. 5 shows a flow chart of a method according to one exemplary embodiment of the present invention.

DETAILED DESCRIPTION OF EXAMPLE EMBODIMENTS

Figure 1:
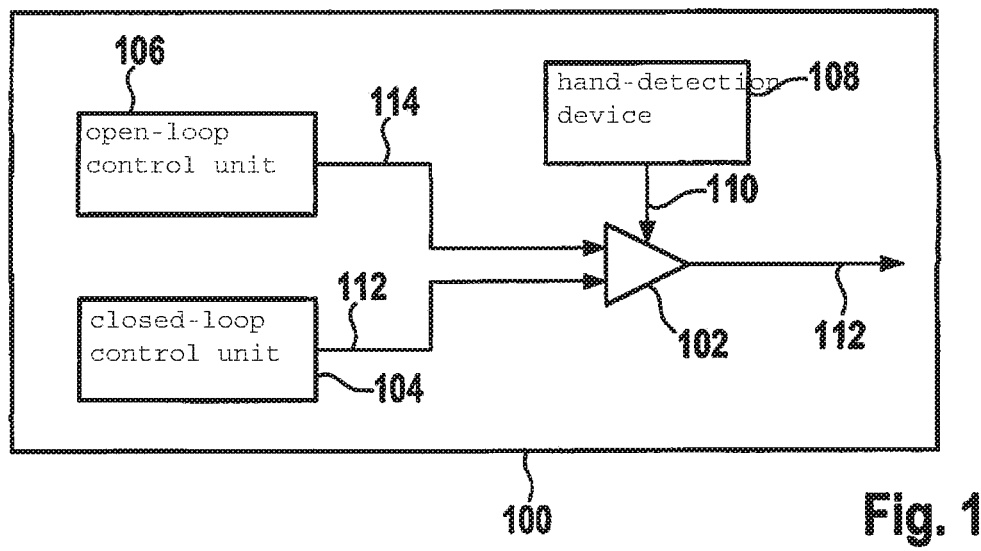
FIG. 1 shows a schematic representation of a lane-keeping assist according to one exemplary embodiment of the present invention.

In the following description of preferred exemplary embodiments of the present invention, the same or similar reference numerals are used for the similarly functioning elements shown in the various figures, a description of these elements not being repeated.

FIG. 1 shows a schematic representation of a lane-keeping assist 100 according to one exemplary embodiment of the present invention. Lane-keeping assist 100 is used to assist a driver in the lateral guidance of his vehicle. According to this exemplary embodiment, lane-keeping assist 100 includes an apparatus 102, a closed-loop control unit 104, an open-loop control unit 106 as well as a hand-detection device 108 which is designed to sense a holding force exerted by at least one hand on a steering wheel of the vehicle, for instance, a manual torque or a deformation of the steering wheel, and to output a detection signal 110 to apparatus 102 as a function of the sensed holding force. For example, detection signal 110 represents hands-off driving of the vehicle when the holding force is less than a predetermined threshold value, and conversely, hands-on driving of the vehicle when the holding force exceeds the threshold value.

Closed-loop control unit 104 is designed to generate a closed-loop control signal 112 for controlling the lateral guidance in closed loop. Analogous to that, open-loop control unit 106 is designed to generate an open-loop control signal 114 for controlling the lateral guidance in open loop. For example, each of the two signals 112, 114 represents an additional steering torque, also known as lane-keeping-assist-system torque or LKS torque for short, counter to the manual torque.

Apparatus 102 is designed, using detection signal 110, to provide closed-loop control signal 112 when detection signal 110 represents the hands-off driving, i.e., when, based on the holding force, it may be assumed that the driver has released the steering wheel, as is the case by way of example in FIG. 1. For example, closed-loop control signal 112 may be used for the autonomous center guidance of the vehicle, by which, for the most part, the vehicle is able to be kept automatically in the center of the lane.

On the other hand, if detection signal 110 represents the hands-on driving, that is, if from the holding force sensed by hand-detection device 108, it follows that the driver is gripping the steering wheel, then instead of closed-loop control signal 112, apparatus 102 provides open-loop control signal 114 by which, for example, a lane-departure-prevention function of lane-keeping assist 100 may be controlled.

According to one exemplary embodiment, open-loop control unit 106 is designed to calculate a steering torque, used for the steering assistance, from a characteristic curve which may be established in the application, for instance, from what is referred to as a bathtub curve. In this context, the closer the vehicle comes to the edge of the lane, the greater the steering torque becomes. On the other hand, in the center of the lane, the steering torque is zero or at least very small. Such an open-loop control method offers the advantage of low complexity and correspondingly easy realizability.

Hand-detection device 108 detects whether or not the driver is co-steering, for instance, based on a measured steering-wheel torque. If the driver is driving hands-off, apparatus 102 switches to closed-loop control by providing closed-loop control signal 112, in order to keep the vehicle in the lane as well as possible. On the other hand, if hand-detection device 108 detects that the driver is co-steering, then apparatus 102 switches to open-loop control by providing open-loop control signal 114, in order to ensure a good and consistent driving feel.

According to one exemplary embodiment, in the case of the hands-off/hands-on detection described above, a debounce time and the thresholds of the manual torque are selected in such a way that on one hand, the switchover from open-loop control to closed-loop control does not take place too quickly, for instance, when the driver only briefly removes his hands from the steering wheel, but on the other hand, also does not take place too slowly, so that the closed-loop control intervenes in sufficient time, before the stability of the vehicle is jeopardized. For example, the debounce time is set to less than 5 s, and is therefore considerably shorter than the time necessary for generating a hands-off warning directed to the driver.

Figure 2:
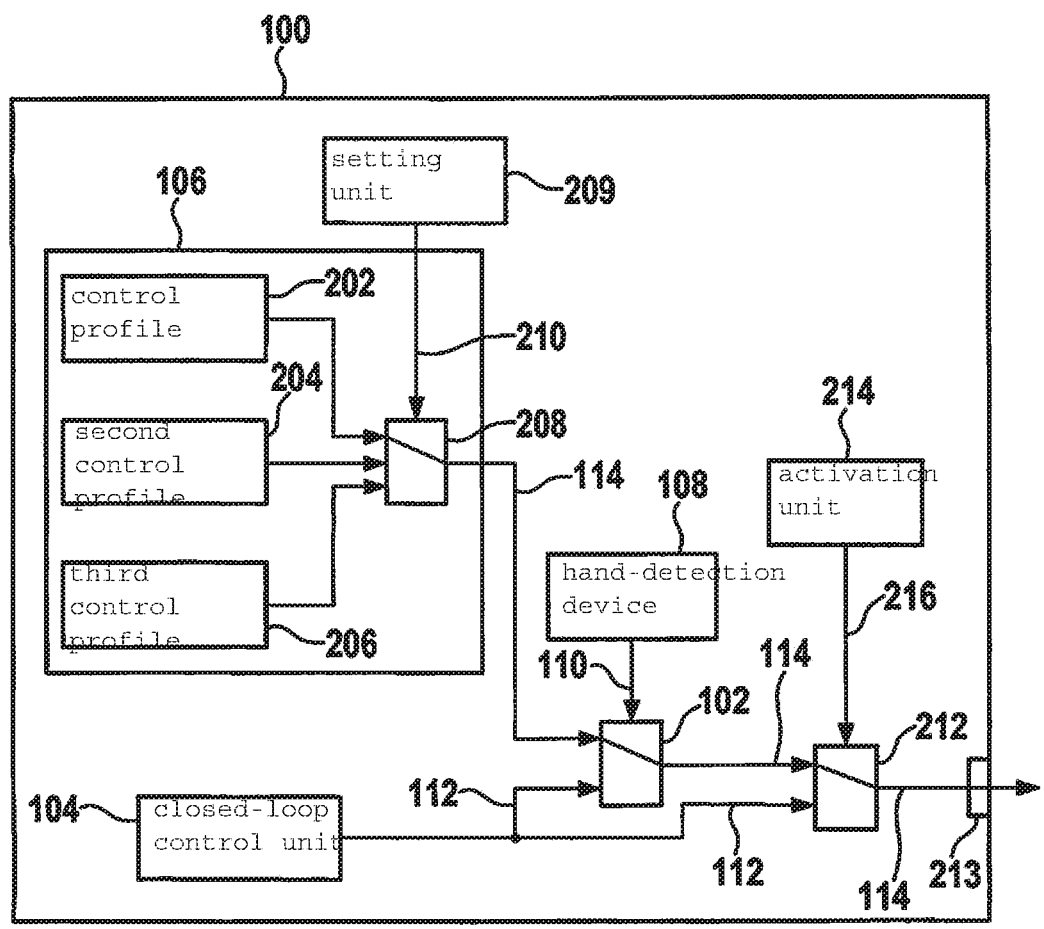
FIG. 2 shows a schematic representation of a lane-keeping assist with variable control profile according to one exemplary embodiment of the present invention.

FIG. 2 shows a schematic representation of a lane-keeping assist 100 with variable control profile according to one exemplary embodiment of the present invention. In contrast to the lane-keeping assist described with reference to FIG. 1, a first control profile 202, a second control profile 204 and a third control profile 206 are stored by way of example in open-loop control unit 106 according to FIG. 2. A profile-activation unit 208 of open-loop control unit 106 is designed to receive from a setting unit 209, information 210 about a profile selection made by the driver, and using information 210, to activate a control profile corresponding to the profile selection, here first control profile 202, as example. Profile-activation unit 208 transmits first control profile 202 in the form of open-loop control signal 114 to apparatus 102.

According to this exemplary embodiment, first control profile 202 is a profile without dead zone, second control profile 204 is a profile with small dead zone and third control profile 206 is a profile with large dead zone. The differences between the three control profiles 202, 204, 206 are explained in greater detail below with reference to FIGS. 3a through 3c.

In contrast to FIG. 1, as example, detection signal 110 represents hands-on driving of the vehicle. Accordingly, apparatus 102 provides open-loop control signal 114 representing first control profile 202.

Apparatus 102 and closed-loop control unit 104 are connected via a switch 212 to a signal output 213 of lane-keeping assist 100. For example, signal output 213 is coupled to a steering system of the vehicle. Switch 212 is coupled to an activation unit 214 which is operable by the driver and which is designed, upon operation, to transmit an activation signal 216 to switch 212. Switch 212 is designed, in response to the reception of activation signal 216, to couple signal output 213 directly to closed-loop control unit 104. In this manner, a closed-loop control of the steering of the vehicle is made possible with the aid of closed-loop control signal 112, regardless of a detection signal 110 present at apparatus 102.

As example, in FIG. 2, signal output 213 is coupled via switch 212 to apparatus 102. Accordingly, in FIG. 2, open-loop control signal 114 is provided via signal output 213.

By the use of lane-keeping assist 100 according to FIG. 2, the driver himself is able to set a profile of the steering assistance as needed. If he himself would like to do no or scarcely any steering, then he may select the closed-loop control. If he would like to steer only a little, then he may select first control profile 202 without dead zone. If he would like to co-steer a little more, then he may activate control profile 204 with small dead zone. If, for the most part, he would like to steer himself, then he may select control profile 206 with large dead zone.

According to one exemplary embodiment, for the open-loop control based on a predicted position of the vehicle in relation to a center of a lane, it may be determined whether, after a certain prediction time, the vehicle is located in the dead zone or outside of the dead zone. Within the dead zone, no steering assistance takes place; outside of the dead zone, the steering assistance is active, that is, for example, the additional steering torque is generated.

The predicted position is used to compensate for a latency in the overall vehicle system.

FIGS. 3a, 3b, 3c show schematic representations of control profiles 202, 204, 206 according to various exemplary embodiments of the present invention. A respective characteristic of control profiles 202, 204, 206, described with reference to FIG. 2, is represented as torque profile in FIGS. 3a through 3c. In this context, a y-axis represents an LKS steering-wheel torque and an x-axis represents a predicted lateral distance of the vehicle to the lane center, which corresponds here to the origin.

FIG. 3a shows first control profile 202 without dead zone. Control profile 202 has an essentially V-shaped form, made up of two straight lines disposed in mirror symmetry relative to each other, which intersect in the origin, that is, to the left of the y-axis, the steering torque drops linearly to zero with decreasing distance to the lane center, and to the right of the y-axis, rises linearly with increasing distance to the lane center.

In contrast to FIG. 3a, the two straight lines of the control profiles shown in FIGS. 3b and 3c do not intersect in the origin, but rather on a negative section of the y-axis not shown here. As an example, control profile 204 has a small dead zone 304 and control profile 206 has a large dead zone 306. The two dead zones 304, 306 are defined by a distance between the intersecting points of the two straight lines with the x-axis. According to this exemplary embodiment, the steering torque within dead zones 304, 306 is equal to zero.

FIG. 4 shows a block diagram of an apparatus 102 according to one exemplary embodiment of the present invention. For example, apparatus 102 is an apparatus, described with reference to FIGS. 1 through 3c, for controlling a lateral guidance of a vehicle in closed loop or open loop with the aid of a lane-keeping assist. Apparatus 102 includes a read-in unit 402 and a provision unit 404. Read-in unit 402 is designed to read in detection signal 110 and to transmit it to provision unit 404. Provision unit 404 is designed, using detection signal 110, to provide closed-loop control signal 112 when detection signal 110 represents hands-off driving of the vehicle. Depending on the specific embodiment, provision unit 404 is designed, using detection signal 110, to additionally or alternatively provide open-loop control signal 114 when detection signal 110 represents hands-on driving.

FIG. 5 shows a flow chart of a method 500 according to one exemplary embodiment of the present invention. Method 500 for controlling a lateral guidance of a vehicle in closed loop or open loop with the aid of a lane-keeping assist may be carried out, controlled or implemented, for example, by an apparatus as described previously on the basis of FIGS. 1 through 4.

In a step 502, a detection signal is read in which represents hands-off or hands-on driving of the vehicle. If the detection signal represents the hands-off driving, then in a step 504, a closed-loop control signal is provided for controlling the lateral guidance in closed loop. On the other hand, if the detection signal represents the hands-on driving, then in step 504, an open-loop control signal is provided for controlling the lateral guidance in open loop.

The exemplary embodiments described and illustrated in the figures are selected only by way of example. Different exemplary embodiments may be combined with each other completely or in terms of individual features. One exemplary embodiment may also be supplemented by features from another exemplary embodiment.

Moreover, the method steps presented here may be repeated, as well as executed in a sequence other than that described.

If an exemplary embodiment includes an "and/or" link between a first feature and a second feature, it is to be read that the exemplary embodiment according to one embodiment has both the first feature and the second feature, and according to a further embodiment, has either only the first feature or only the second feature.

What is claimed is:

1. A method comprising:
    obtaining from a sensor of a vehicle a signal that indicates whether there is a hands-off driving of the vehicle or a hands-on driving of the vehicle; and
    based on the obtained signal, controlling a steering of the vehicle;
    wherein:
        the controlling is performed by executing an algorithm that defines that the controlling of the steering is a closed-loop control of the steering when the detection signal indicates presence of the hands-off driving and that the controlling of the steering is an open-loop control of the steering when the detection signal indicates presence of the hands-on driving;
        the closed-loop control iteratively comparing an actual value of a distance of the vehicle from a center of the vehicle's lane or a boundary of the vehicle's lane to a target value of the distance and controlling the steering to reduce a difference, determined by the comparison, between the actual value and the target value, with the iterations being performed until the difference is reduced to zero; and
        the open-loop control includes applying a steering torque at a level set based on a distance of the vehicle from the center or boundary of the vehicle's lane, such that the greater the distance, the greater the applied steering torque.

2. The method as recited in claim 1, wherein the detection signal is a function of (1) a sensed holding force exerted by at least one hand on a steering wheel of the vehicle and (2) at least one of a predetermined debounce time and a predetermined threshold value for the holding force.

3. The method as recited in claim 1, wherein a manner in which the open-loop control is performed varies depending on which of a plurality of control profiles is selected.

4. The method as recited in claim 3, wherein the control profile represents a characteristic of a steering torque for the steering assistance as a function of a lateral position of the vehicle in a traffic lane.

5. The method as recited in claim 4, wherein the steering torque within a predetermined distance to a center of the traffic lane is equal to zero.

6. The method as recited in claim 3, wherein the plurality of control profiles differ with respect to a size of a dead zone measured from the center of the vehicle's lane in which the steering torque output of the open-loop control is not performed.

7. A non-transitory machine-readable storage medium on which is stored program code that is executable by a computer and that, when executed by the computer, causes the computer to perform a method, the method comprising:
    obtaining from a sensor of a vehicle a signal that indicates whether there is a hands-off driving of the vehicle or a hands-on driving of the vehicle; and
    based on the obtained signal, controlling a steering of the vehicle;
    wherein:
        the controlling is performed by executing an algorithm that defines that the controlling of the steering is a closed-loop control of the steering when the detection signal indicates presence of the hands-off driving and that the controlling of the steering is an open-loop control of the steering when the detection signal indicates presence of the hands-on driving;
        the closed-loop control iteratively comparing an actual value of a distance of the vehicle from a center of the vehicle's lane or a boundary of the vehicle's lane to a target value of the distance and controlling the steering to reduce a difference, determined by the comparison, between the actual value and the target value, with the iterations being performed until the difference is reduced to zero; and
        the open-loop control includes applying a steering torque at a level set based on a distance of the vehicle from the center or boundary of the vehicle's lane, such that the greater the distance, the greater the applied steering torque.

8. A system of a vehicle, the system comprising:
    a sensor; and
    a processor;
    wherein the sensor is configured to:
        obtain from the sensor a signal that indicates whether there is a hands-off driving of the vehicle or a hands-on driving of the vehicle;

when the signal indicates presence of the hands-off driving, control a steering of the vehicle by executing a closed-loop control in which the processor iteratively compares an actual value of a distance of the vehicle from a center of the vehicle's lane or a boundary of the vehicle's lane to a target value of the distance and controls the steering to reduce a difference, determined by the comparison, between the actual value and the target value, with the iterations being performed until the difference is reduced to zero; and when the signal indicates presence of the hands-on driving, control the steering of the vehicle by executing an open-loop control in which the processor triggers application of a steering torque at a level set based on a distance of the vehicle from the center or boundary of the vehicle's lane, such that the greater the distance, the greater the applied steering torque.

\* \* \* \* \*